July 16, 1929.  A. T. SMITH  1,721,191
ELECTRIC RANGE
Filed Sept. 13, 1926  2 Sheets-Sheet 1
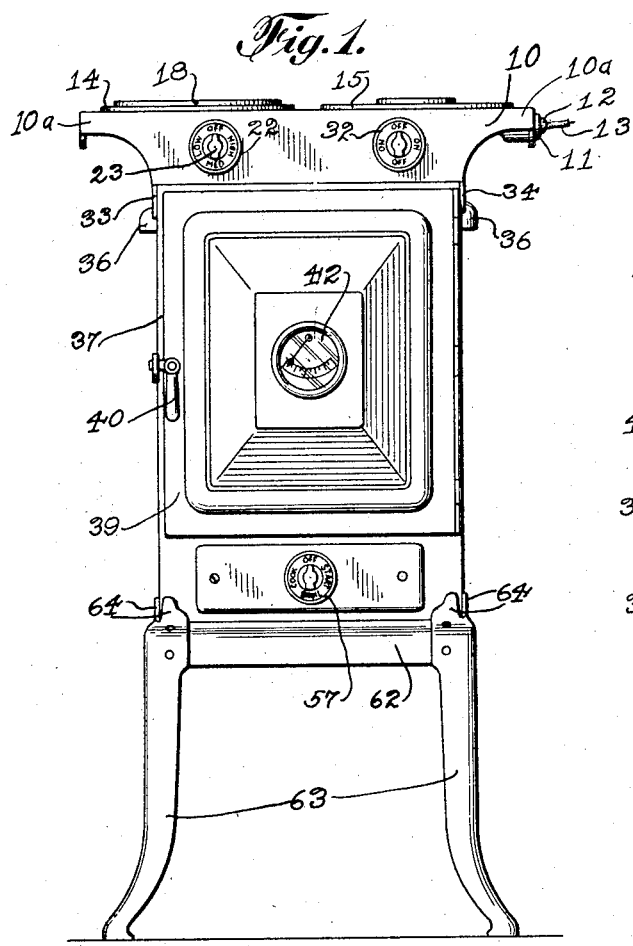
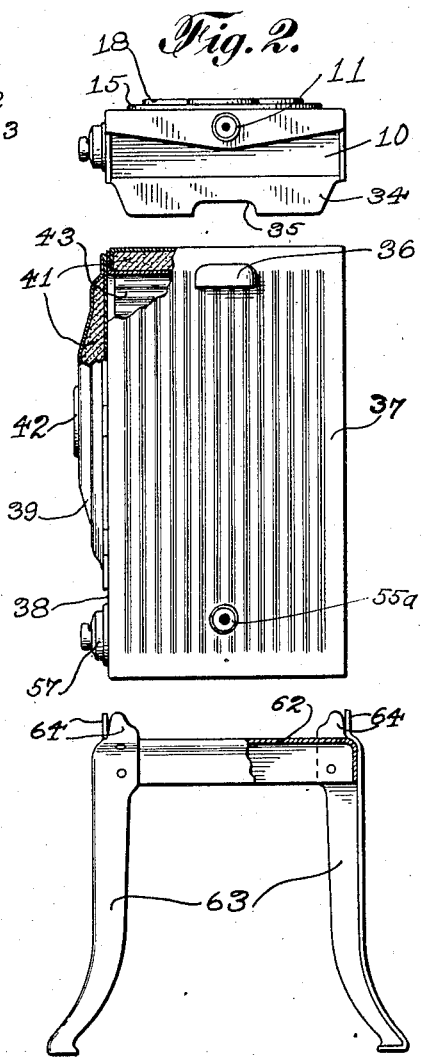
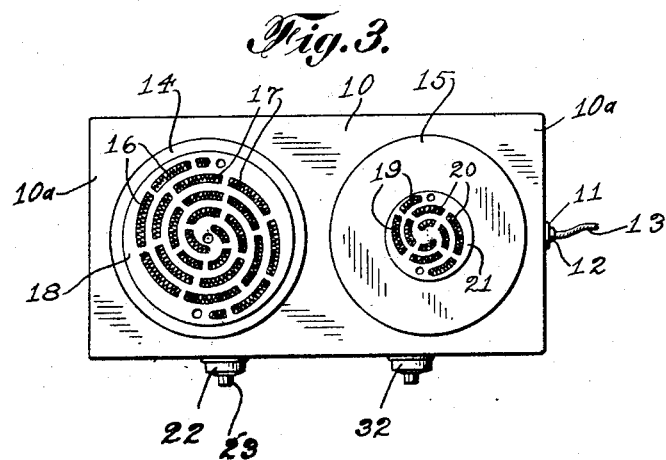
INVENTOR
Alva T. Smith
BY
H. G. Manning
ATTORNEY July 16, 1929.                A. T. SMITH                    1,721,191
                             ELECTRIC RANGE
                        Filed Sept. 13, 1926            2 Sheets-Sheet 2
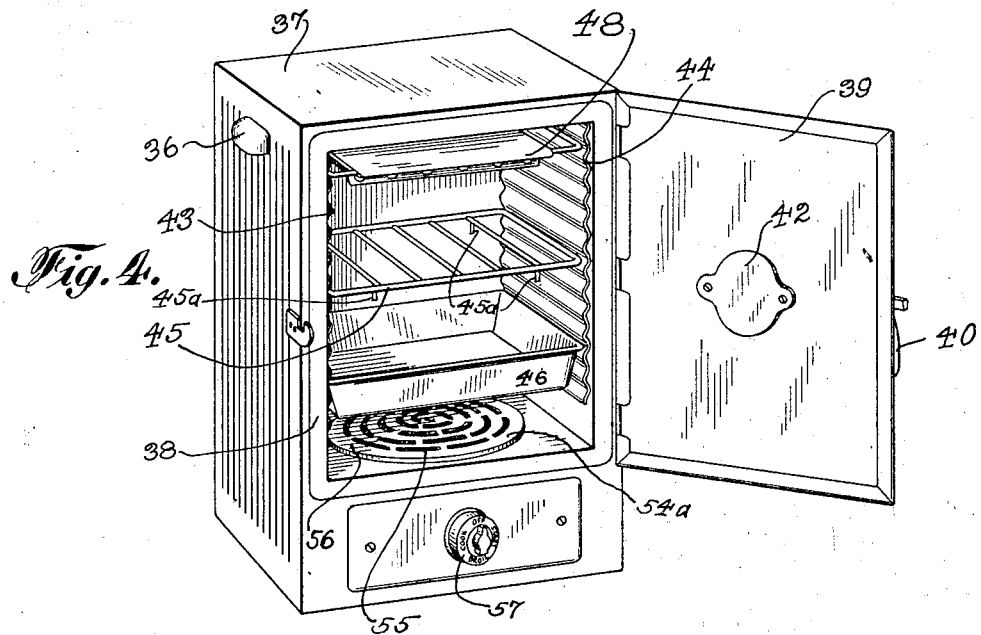
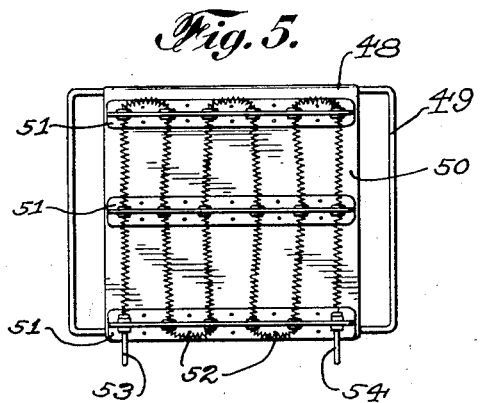
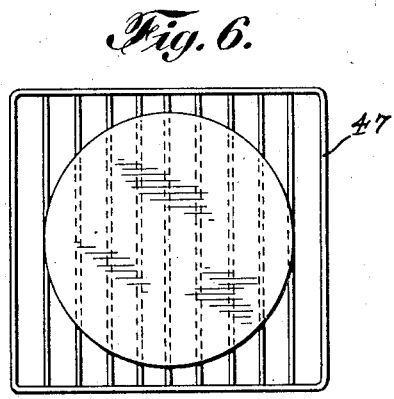
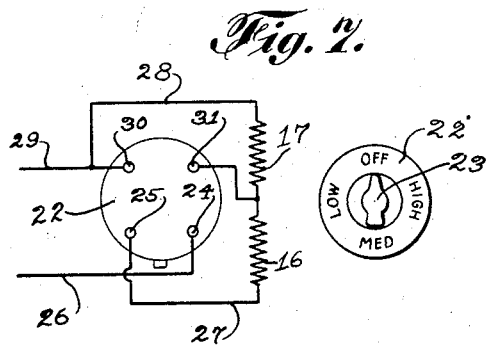
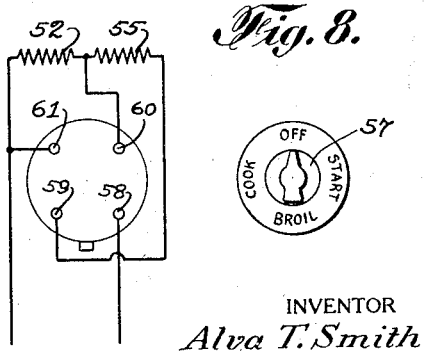
INVENTOR
*Alva T. Smith*
BY
*H. G. Manning*
ATTORNEY Patented July 16, 1929.

1,721,191

UNITED STATES PATENT OFFICE.

ALVA T. SMITH, OF WATERBURY, CONNECTICUT, ASSIGNOR, BY MESNE ASSIGNMENTS, TO THE BEARDSLEY AND WOLCOTT MANUFACTURING COMPANY, OF WATERBURY, CONNECTICUT, A CORPORATION OF CONNECTICUT.

ELECTRIC RANGE.

Application filed September 13, 1926. Serial No. 135,013.

This invention relates to electric ranges, and more particularly to electric ranges that can be purchased by people of moderate means, and connected to the lamp sockets or wall outlets of the ordinary electric house-lighting system.

One object of this invention is to provide an electric range having an oven and a top stove portion constructed as individual complete units that can be used separate and apart from each other, and which, together with a base, can be purchased separately, from time to time, and combined by the purchaser as additional units are acquired.

A further object is to provide an electric range of the above nature which will be simple in construction, inexpensive to manufacture, easy to install and manipulate, compact, light in weight, ornamental in appearance, and very efficient and durable in use.

With these and other objects in view, there has been illustrated on the accompanying drawing one form in which the invention may be conveniently embodied in practice.

Fig. 1 represents a front view of an electric range with the three sections thereof shown in their assembled positions.

Fig. 2 is a side view of said range with the sections thereof in separated relationship, and with the oven shown partly in section.

Fig. 3 is a top plan view of the stove section.

Fig. 4 is a perspective view of the oven shown in open position, and illustrating the upper broiling unit, the lower oven heating plate, a food-holding rack, and a utility pan.

Fig. 5 is a bottom view of the oven broiling unit showing the heating coil.

Fig. 6 is a top view of a second form of oven rack having a baffle plate attached thereto.

Fig. 7 is a diagrammatic view of the wiring system and operating switch for the left-hand heating plate of the top stove section, as viewed in Fig. 3.

Fig. 8 is a diagrammatic view of the wiring system and switch for controlling both of the oven-heating units.

Referring now to the drawings in which like reference numerals denote corresponding parts throughout the several views, the numeral 10 indicates generally the top stove section or unit, said section being substantially rectangular in plan. At one of the ends $10^a$ of the stove section, provision is made of a wall outlet receptacle 11 connected to the hot plates and their switches and adapted to receive a standard form of electric attachment plug 12, said plug being suitably connected with an electric cord 13 leading to any convenient source of current supply.

The stove 10 is provided on its top face with a pair of heating plates 14 and 15, the heating plate 14 being adapted to furnish different degrees of uniformly distributed heat from substantially the same area of the plate, while the plate 15 is adapted to supply a centrally concentrated heat. For the former purpose the plate 14 is provided with relatively long spaced spiral heating coils 16 and 17, the spiral lines followed by said coils having substantially the same datum point and being substantially parallel throughout their lengths. The coils are located in the same plane, and are preferably covered by an apertured plate 18 of slightly less diameter than the plate 14.

The heating plate 15 also may be provided with a pair of relatively short spiral heating coils 19 and 20, said coils also being substantially parallel throughout their lengths, and likewise protected by small apertured plate 21. The area encompassed by the heating elements 19 and 20 is considerably less than the area encompassed by the elements 16 and 17, the diameter of the cover plate 21 being preferably less than half that of the plate 15; thus a much more concentrated heat is produced at the plate 15 than with the left-hand plate 14.

In order to control the heat developed by the coils 16 and 17 of the plate 14, provision is made of a four-position switch 22, located in the front of the stove section 10 and having the legends "Off", "Low", "Medium", and "High" surrounding the switch handle 23.

A suitable wiring diagram for the switch 22 and its corresponding heating plate 14 is shown in Fig. 7. In operation, when the switch handle 23 is turned to the "low" position, the terminal 24 will be connected to the terminal 25, thereby causing current to flow from a line wire 26, through the switch, through a wire 27 and both coils 16 and 17 in series, and out through a wire 28 to the other line wire 29.

When the switch is turned to "medium", the terminals 24 and 25 will be connected as before, but in addition the terminal 30 will be connected with the terminal 31, thereby short-circuiting the coil 17, and causing the current to flow directly back to the line wire 29 after passing through the coil 16 only. Under these conditions, since the electrical resistance is reduced by practically one-half, substantially twice the amount of heating current will flow than when the switch is at the "low" position.

When the switch is turned to "high", the terminal 24 will be connected to the contact terminal 31, and the terminal 25 to the contact terminal 30. This will cause both of the coils 16 and 17 to be operated in parallel with the result that about four times the amount of heating will take place under these conditions than when the switch is set at "low". In the "off" position of the switch, both circuits are open and current flows to neither of the heating coils 16 and 17.

The concentrated heating plate 15 is controlled by a switch 32, preferably of any standard simple "on and off" type, and serving simply to energize both the elements 19 and 20 or open the circuit completely.

The stove section 10 is provided near its ends with a pair of depending flanges 33 and 34 parallel to each other and arranged to fit closely over opposite sides of the oven, and having arcuate recesses 35 adapted to fit over a pair of similarly-shaped handle members 36 on the same sides of the oven 37 as most clearly shown in Fig. 2.

The oven 37 is preferably made in the shape of a rectangular box with its open front side 38 closed by a hinged door 39, said door having the usual handle 40. The walls of the oven and door are preferably made hollow, as clearly shown in Fig. 2 and are insulated by being filled with layers 41 of asbestos sponge felt or other suitable heat-insulating material. An oven thermometer 42 is preferably located in the hollow front door 39.

The sides of the interior of the oven are provided with corrugated linings 43 and 44, the grooves and ribs of said corrugations lying in horizontal alinement so that they will interchangeably support a variety of food-holding devices such as a wire food-holding broiler and rack 45 having depending feet 45ª, a flanged tray or roasting or "utility pan" 46, and the modified baffle rack 47. If desired, the rack 45 and "utility pan" 46 may be simultaneously supported by the same or adjacent pairs of ribs of the corrugated side linings 43 and 44 when broiling is to be done on the rack 45. In horizontal cross-area, the oven is made only substantially large enough to receive a suitable roasting pan 46 (see Fig. 4), which thus shuts off the top of the oven from heat developed at the bottom.

In order to supply heat to the top of the food being baked, roasted, etc., provision is made of a downwardly facing broiling unit 48 comprising a rectangular wire frame 49 adapted to slide in the grooves at the top of the side linings 43 and 44, said wire frame having a top metal shield 50 connected thereto. The shield 50 is provided on its under side with three narrow strips 51 which form supports for a heating coil 52. The coil 52 is looped back and forth across the shield 50 in serpentine fashion, and is connected at its extreme ends with plug terminals 53 and 54, said plug terminals being adapted to engage in suitable sockets not shown, located in the rear of the oven.

The floor of the oven is provided with a heating plate 54ª having a single spiral coil 55, said coil being covered by an apertured plate 56 similar to the plates 18 and 21, previously mentioned, of the top stove. The heating coil 52 of the broiling unit 48 and the coil 55 of the heating plate 54ª are supplied with current from a single wall outlet receptacle 55ª near the bottom of the oven 37, and said coils are controlled by a switch 57 located in the front of the oven below the door 39. The switch 57 is surrounded by legends "Off", "Start", "Broil", and "Cook", respectively, and is provided with terminals 58, 59, 60, and 61 as shown in Fig. 8. In the operation of this switch, when the switch handle is in the "start" position, the terminals 58 and 59 are connected together, and the terminals 60 and 61 are also connected together, allowing the current to flow through the coil 55 only, the coil 52 being short-circuited. In this position of the switch, the oven is heated up preliminary to baking, roasting, etc., as the legend "start" indicates.

When the switch 57 is turned to "broil" position, the contact 58 will be connected with the contact 60, thus cutting out the bottom plate coil 55 and allowing the current to flow only through the coil 52, thus heating the upper or "broiling" unit to its highest heat for boiling purposes.

When the switch is in the "cook" position, the contact 58 will be connected with the contact 59 thus causing the current to flow in series through both of the coils 52 and 55. Under these conditions, the amount of current consumed will be approximately one-half of that consumed when the switch is in the "start" position, and the heat developed is about one-half that developed by the plate 54ª alone or the broiler alone. As the legend "cook" indicates, this is the position of the switch in which the heat for oven-cooking, e. g. baking and roasting, is continued for as long as may be necessary.

It will be observed that the described arrangement is a simple one and permits oven-cooking from an ordinary house-lighting outlet, while a standard four-position switch serves to heat the upper unit for broiling. The bottom unit is adapted to preheat the oven and to be used for stewing, boiling, etc. Coupled with quick-heating of the oven, this improved construction has utility in that it permits the use of a utensil which substantially fills the cross-section of the oven, and hence shuts off the convection currents ordinarily equalizing the temperature around the food in larger ovens.

The base of the electric range comprises an inverted flanged platform or frame 62 having four flanged legs 63 riveted or otherwise secured thereto. The legs 63 have their upper ends bifurcated and extended upwardly for a short distance beyond the platform 62 so as to form resilient guides 64 interfitting with the corners of the oven 37.

It will be understood that if desired, the stove section may be sold separately from the oven and base, or the oven alone may be purchased, without requiring the customer to purchase a complete range. The stove section may obviously be used independently of the oven and vice versa, and may be placed directly upon a table or other support.

One advantage of this invention is that food may be baked in the oven simultaneously from the top and bottom causing a more even distribution of heat through food, and considerably reducing the baking period.

A further advantage is that when the parts are assembled, the electric range will be extremely rigid and not likely to fall apart in use, even though no attaching screws or bolts are employed, and the three units may be assembled by the purchaser without tools and without skill.

A still further advantage is that the oven with its hollow insulated walls will operate on the well-known "fireless cooker" principle, permitting the cooking of the food to be continued after the current has been turned off.

While there has been disclosed in the specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electric range, a completely enclosed oven, said oven having lifting handles upon its sides, a top stove section adapted to rest upon said oven and having depending flanges embracing the sides thereof, said flanges having recesses to receive said lifting handles, said oven and top stove section being detachable and comprising complete units capable of separate use.

2. In an electric range, a completely enclosed oven, said oven having lifting handles upon its sides, a top stove section adapted to rest upon said oven and having depending flanges embracing the sides thereof, said flanges having recesses to receive said lifting handles, said oven and top stove section being detachable and comprising complete units capable of separate use, and a base for said oven, said base having upstanding flanges for fitting about said oven.

3. In an electric range, a completely enclosed oven with its heating means, and a top stove section with its heating means adapted to rest upon said oven, having depending flanges fitted over the sides of said oven and forming therewith a complete range, means for supplying current to said oven and stove section separately, said oven and stove section being capable of use both in combination and detached from each other.

In testimony whereof, I have affixed my signature to this specification.

ALVA T. SMITH.